United States Patent
Zako

(10) Patent No.: US 12,360,412 B2
(45) Date of Patent: Jul. 15, 2025

(54) DISPLAY DEVICE AND LIQUID CRYSTAL DISPLAY DEVICE

(71) Applicant: Japan Display Inc., Tokyo (JP)

(72) Inventor: Muneaki Zako, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/780,793

(22) Filed: Jul. 23, 2024

(65) Prior Publication Data

US 2024/0377673 A1 Nov. 14, 2024

Related U.S. Application Data

(63) Continuation of application No. PCT/JP2023/000605, filed on Jan. 12, 2023.

(30) Foreign Application Priority Data

Feb. 8, 2022 (JP) .................................. 2022-017770

(51) Int. Cl.
*G02F 1/1333* (2006.01)
*G02F 1/1334* (2006.01)
(Continued)

(52) U.S. Cl.
CPC .... *G02F 1/133331* (2021.01); *G02F 1/13336* (2013.01); *G02F 1/1334* (2013.01); *G02F 1/133603* (2013.01); *G02F 1/1339* (2013.01)

(58) Field of Classification Search
CPC ........... G02F 1/133331; G02F 1/13336; G02F 1/1334; G02F 1/133603; G02F 1/1339;
(Continued)

(56) References Cited

U.S. PATENT DOCUMENTS 11,768,409 B2 9/2023 Ohue
2021/0080769 A1 3/2021 Tian et al.
(Continued)

FOREIGN PATENT DOCUMENTS

JP S61-138286 A 6/1986
JP 2020-112738 A 7/2020
(Continued)

OTHER PUBLICATIONS

International Search Report mailed on Apr. 4, 2023 for the corresponding PCT Application No. PCT/JP2023/222605, with English translation.
(Continued)

*Primary Examiner* — James R Greece
*Assistant Examiner* — Jose M Diaz
(74) *Attorney, Agent, or Firm* — Michael Best & Friedrich LLP

(57) ABSTRACT

The purpose of the present invention is to seamlessly form a large screen using multiple display devices. To solve this problem, the present invention is configured as follows. A display device including: a first display device including a first display area and a first frame area disposed outside of the first display area; a second display device including a second display area and a second frame area disposed outside of the second display area, in which the first display device and the second display device are arranged in parallel, with portions overlapping each other; the first frame area of the first display device overlaps the second display area of the second display device, and the second frame area of the second display device overlaps the first display area of the first display device; and the first display area and the second display area are continuous in a plan view.

11 Claims, 18 Drawing Sheets

(51) Int. Cl.
*G02F 1/13357* (2006.01)
*G02F 1/1339* (2006.01)

(58) Field of Classification Search
CPC . G02F 1/133615; G02F 1/1333; G02F 1/1336
See application file for complete search history.

(56) References Cited

U.S. PATENT DOCUMENTS

| | | | |
|---|---|---|---|
| 2021/0325720 A1* | 10/2021 | Yu | G02F 1/133788 |
| 2021/0333545 A1* | 10/2021 | Hong | G02B 27/0101 |
| 2021/0341663 A1 | 11/2021 | Fukuoka | |
| 2022/0171228 A1 | 6/2022 | Nakamura et al. | |
| 2022/0283462 A1 | 9/2022 | Ohue | |

FOREIGN PATENT DOCUMENTS

| | | |
|---|---|---|
| JP | 2021-032938 A | 3/2021 |
| JP | 2021-092702 A | 6/2021 |
| JP | 2021-092748 A | 6/2021 |
| WO | 2018-043337 A1 | 3/2018 |

OTHER PUBLICATIONS

Japanese Office Action mailed on Mar. 5, 2025 for the corresponding Japanese Patent Application No. 2023-580116, with English machine translation.

* cited by examiner

B-B

D-D

E-E

G-G

H-H

DISPLAY DEVICE AND LIQUID CRYSTAL DISPLAY DEVICE

The present application is a continuation application of International Application No. PCT/JP2023/000605, filed on Jan. 12, 2023, which claims priority to Japanese Patent Application No. 2022-017770, filed on Feb. 8, 2022. The contents of these applications are incorporated herein by reference in their entirety.

BACKGROUND OF THE INVENTION

(1) Field of the Invention

The present invention relates to a display device, and in particular, to a transparent display device using a liquid crystal display device.

(2) Description of the Related Art

There is demand for transparent display devices in which the background is visible, as glass. Transparent display devices allow, for example, images displayed on the front side to be seen in an overlaid manner on the background on the back side. In addition, the background image can be viewed through the glass even in areas where no image is displayed. Such a transparent display device can be realized, for example, using a liquid crystal display device.

The patent documents 1 to 3 describe a configuration for realizing a transparent liquid crystal display device using commonly called polymer dispersed liquid crystals.

Patent Document 1: Japanese Patent Publication No. 2021-92748
Patent Document 2: Japanese Patent Publication No. 2021-92702
Patent Document 3: Japanese Patent Publication No. 2021-32938

SUMMARY OF THE INVENTION

In transparent liquid crystal display devices, etc., it is difficult to enlarge the screen size because of the luminance tilt problem that is likely to occur. When enlarging the screen, a means of arranging multiple transparent display devices in parallel can be taken. However, liquid crystal display devices require a picture frame area (herein after frame area and picture frame area are used interchangeably) for the placement of the scanning line drawer lines. Since the screen is interrupted by the presence of this frame area, it is difficult to display a natural image simply by arranging multiple transparent liquid crystal display devices in parallel.

The purpose of the present invention is to realize a natural large-screen transparent display device with a plurality of transparent liquid crystal display devices, in which the screen is not interrupted. Furthermore, it is to realize a transparent liquid crystal display device with small unevenness in luminance.

The present invention realizes the above-mentioned purposes, and typical means are as follows.

(1) A display device including: a first display device including a first display area and a first frame area disposed outside of the first display area; a second display device including a second display area and a second frame area disposed outside of the second display area, in which the first display device and the second display device are arranged in parallel, with portions overlapping each other; the first frame area of the first display device overlaps the second display area of the second display device, and the second frame area of the second display device overlaps the first display area of the first display device; and the first display area and the second display area are continuous in a plan view.

(2) A liquid crystal display device including: a first liquid crystal display device including a first thin-film transistor substrate and a first opposing substrate being bonded together at a first frame area with a first sealant, a first liquid crystal being sealed therein, and a first display area being formed in an area in which the first liquid crystal is sandwiched; a second liquid crystal display device including a second thin-film transistor substrate and a second opposing substrate being bonded together at a second frame area with a second sealant, a second liquid crystal being sealed therein, and a second display area being formed in an area in which the second liquid crystal is sandwiched, in which the first liquid crystal display device and the second liquid crystal display device are arranged in parallel, with portions thereof overlapping each other; the first frame area of the first liquid crystal display device overlaps the second display area of the second liquid crystal display device, and the second frame area of the second liquid crystal display device overlaps the first display area of the first liquid crystal display device; and the first display area and the second display area are continuous in a plan view.

DETAILED DESCRIPTION OF THE PREFERRED EMBODIMENT

The present invention is explained in detail using the following embodiments.

Embodiment 1

Figure 1:
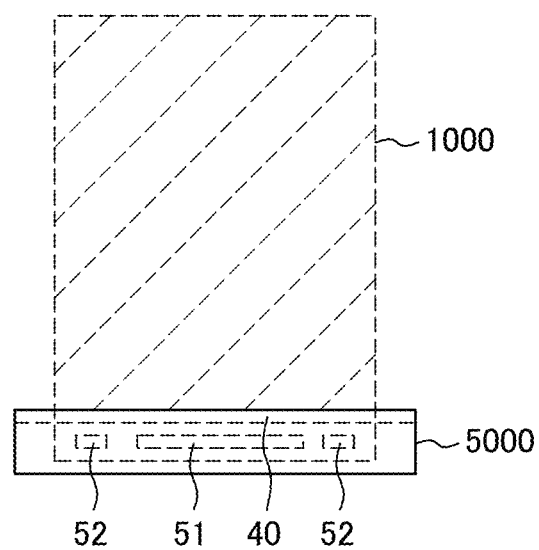
FIG. 1 is a front view of a transparent liquid crystal display device.
Figure 2:
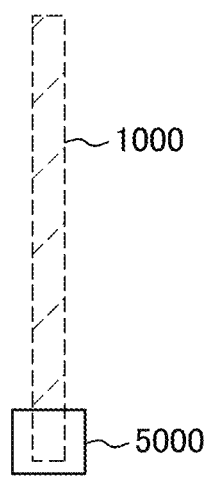
FIG. 2 is a side view of the transparent liquid crystal display device.

FIG. 1 is a front view of a transparent liquid crystal display device and FIG. 2 is a side view of the same. In FIGS. 1 and 2, there is no backlight on the back of the display area, and the substrate is made of transparent glass, therefore, light is usually transmitted through it, allowing the background on the back side of the transparent liquid crystal display device to be seen, and the background on the front side can be seen from the back side.

The transparent liquid crystal display device depicted in FIGS. 1 and 2 consists of a single display panel 1000, but the following actions are the same when a large-screen transparent liquid crystal display device is configured by arranging two or more liquid crystal display panels side by side, as will be explained later.

A light source 40 as a side light and driver integrated circuits (ICs) 51, 52, etc. are located in a lower pedestal 5000. The display panel 1000 is transparent, so that the facing side of the display panel can be viewed like a glass window. In addition, the image displayed on the display panel 1000 can be viewed from either the back side or the front side. Therefore, the image displayed on the transparent liquid crystal display device can give the impression of floating in the background.

FIGS. 1 and 2 show examples of the transparent liquid crystal display devices. For example, by attaching it to a window glass, it can be used as a window glass under normal circumstances and can be used to display images on the window when necessary. Also, when used as a display device for automobiles, it can be used as a window through which the outside can normally be seen, and images can be displayed on the display area when necessary.

Figure 3:
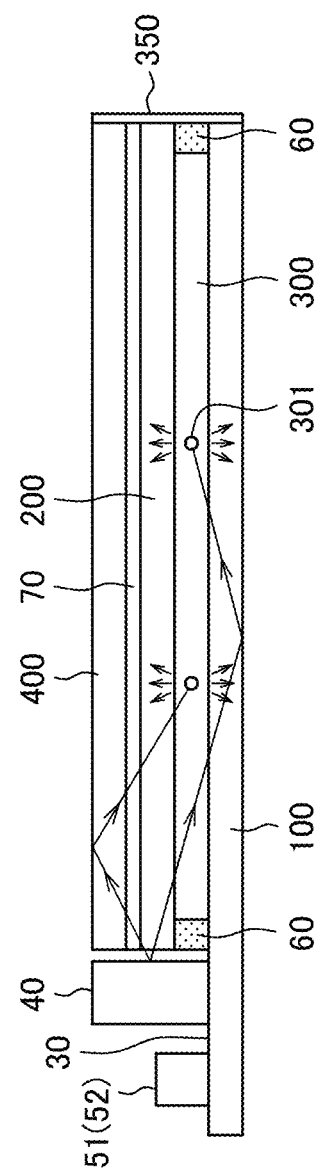
FIG. 3 is a cross-sectional view of the operation of the transparent liquid crystal display device.

FIG. 3 depicts a cross-sectional view of the operation of the transparent liquid crystal display device. In FIG. 3, a liquid crystal 300 is sandwiched between a thin-film transistor (TFT) substrate 100 on which pixel electrodes, scanning lines, video signal lines, a TFT, etc. are arranged, and an opposing substrate 200 on which common electrodes, black matrix, etc. are formed. A cover glass 400 is placed over the opposing substrate 200. The surface of the cover glass 400 has a surface treatment to prevent fingerprints, etc. from adhering to it when being touched by a finger. This surface treatment is sometimes referred to as anti-finger (AF) treatment.

The opposing substrate 200 and cover glass 400 are bonded together by optical clear adhesive (OCA) 70. The OCA 70 is a transparent adhesive sheet and has a refractive index close to that of glass. The thickness of OCA 70 is, for example, 0.1 mm. Instead of OCA, it may be bonded by a transparent resin such as an optical clear resin (OCR).

The liquid crystal display device in FIG. 3 is driven in the commonly called field sequential mode, so that there is no color filter. Since no color filter is used, the light transmittance of the display area can be increased. The display area is formed in the area where the TFT substrate 100 and the opposite substrate 200 overlap, and a terminal area 30 is formed in the area of the TFT substrate 100 that does not overlap with the opposite substrate 200.

In FIG. 3, the TFT substrate 100 and the opposite substrate 200 are bonded together with a transparent sealant 60, and the liquid crystal 300 is sealed thereinside. The liquid crystal 300 in FIG. 3 is a commonly called polymer dispersed liquid crystal. The liquid crystal configuring the liquid crystal layer 300 normally transmits light, but when voltage is applied between the pixel electrode formed on the TFT substrate 100 and the common electrode formed on the opposite substrate 200, the orientation of liquid crystal molecules 301 changes and scatters light. By controlling the scattering action of the liquid crystal molecules 301 for each pixel, an image can be formed. This image can be seen from both the front and back of the liquid crystal display panel.

In FIG. 3, the TFT substrate 100 is formed larger than the opposing substrate 200, and the area where the TFT substrate 100 and the opposing substrate 200 do not overlap is the terminal area 30. The light source 40 is provided on the terminal area 30 so as to face the side of the opposite substrate 200 or the side of the cover glass 400. The light source 40 consists of light emitting diodes (LEDs) 41 and a lens 42, as depicted in FIG. 4.

Figure 4:
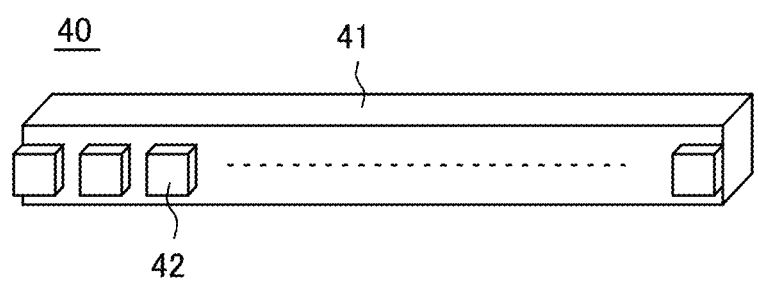
FIG. 4 is a perspective view of a light source.

As depicted in FIG. 4, the light source 40 consists of a plurality of LEDs 41 arranged on the sides of the lens 42. Light emitted from the LED 41 is converged or diverged by the lens 42 and enters the display area of the transparent liquid crystal display device from the sides of the opposing substrate 200 or the cover glass 400, as depicted in FIG. 3. As depicted in FIG. 3, the light emitted from the LED 41 is converged or diverged by the lens 42.

The LED 41 has, for example, three LED chips that generate red, green, and blue light per package. The LED 41 may also have LED chips that generate any one of red, green, and blue light per package, and the LED 41 of different colors may be arranged in a row. The liquid crystal display device in FIG. 3 is driven in field sequential mode. That is, it displays a red image, a green image, and a blue image in a time-shared manner to display a color image. In the following drawings, the light source 40 is depicted as a unified whole of the integrated LED 41 and the lens 42.

Returning to FIG. 3, light from the light source 40 enters the interior of the liquid crystal display panel through the side of the opposing substrate 200, the side of the cover glass 400, or the sealing material 60. The incident light repeatedly reflects and strikes the liquid crystal molecules 301 in the liquid crystal layer 300. In the liquid crystal molecules 301 in the pixel where voltage is applied between the pixel electrode and the common electrode, the light is scattered as depicted in FIG. 3. Meanwhile, in the pixel where no voltage is applied between the pixel electrode and the common electrode, light travels straight. As a result, light incident within the liquid crystal layer 300 is controlled to scatter in each pixel, and thus an image is formed.

Figure 5:
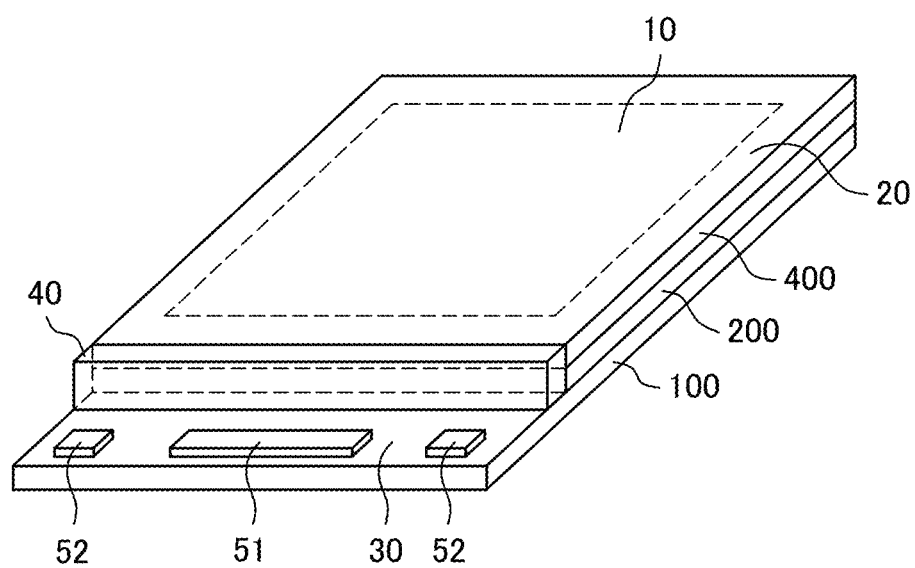
FIG. 5 is a perspective view of the transparent liquid crystal display device.

In FIG. 3, reflectors 350 are attached to the sides of the TFT substrate 100, the opposing substrate 200, and the cover glass 400 on the side facing the light source 40 to reflect light arriving at the edge to the display area. In FIG. 5 and below, the reflector 350 is omitted. In FIG. 3, driver ICs 51 and 52 are placed in the terminal area 30 alongside the light source 40.

FIG. 5 is a perspective view of the transparent liquid crystal display device used in the present invention. In FIG. 5, the TFT substrate 100 and the opposing substrate 200 are arranged overlapping each other. As depicted in FIG. 3, the liquid crystal 300 is sandwiched between the TFT substrate 100 and the opposing substrate 200. On the opposing substrate 200, the transparent first cover glass 400 made of glass is attached as a mechanical protection and a light guide plate for the light emitted from the light source 40. The thickness of each of the TFT substrate 100, the opposing substrate 200, and the cover glass 400 is, for example, 0.5 or 0.7 mm.

In FIG. 5, the display area 10 is formed in the overlapped portion of the TFT substrate 100 and the opposing substrate 200; and the periphery of the display area 10 is the frame area 20. In the frame area 20, the scanning line drawer lines and the like are arranged. A feature of the liquid crystal display panel depicted in FIG. 5 is that the light source 40 is arranged over the entire side of the opposite substrate 200 and the cover glass 400 along the terminal area 30. In other words, light from the light source 40 also enters the portion corresponding to the picture frame area 20 where no pixel electrodes are formed. This allows uneven luminance in the display area 10 to be suppressed.

In FIG. 5, the driver ICs 51 and 52 are placed in the terminal area 30 in addition to the light source 40. In the center of the terminal area 30, the driver IC 51 for video signals is placed, and the driver ICs 52 for scanning signals are placed on both sides of it. A flexible wiring board for supplying signals and power is connected to the terminal area 30, but is omitted in FIG. 5.

Figure 6:
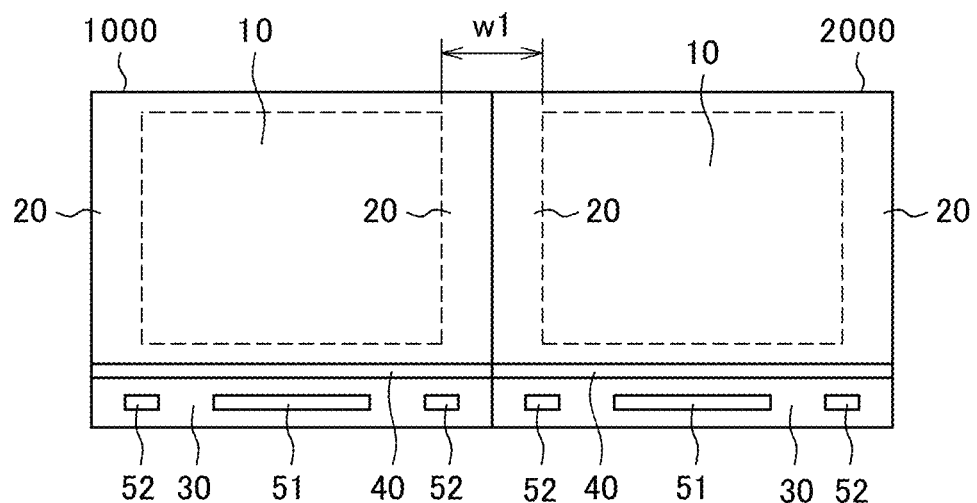
FIG. 6 is a front view of the problem of creating a large screen by placing two transparent liquid crystal display devices side by side.

In the transparent liquid crystal display device depicted in FIG. 3 through 5, uneven brightness of the screen becomes a problem when a large screen is attempted. Therefore, in order to obtain a transparent liquid crystal display device with a large screen, it is conceivable to juxtapose multiple transparent liquid crystal display devices. FIG. 6 is an example thereof. In FIG. 6, two transparent liquid crystal display devices 1000 and 2000 are arranged in parallel. In FIG. 6, a single image is formed by the two display areas 10. However, in the configuration of FIG. 6, the screen is divided by the frame area 20 over a width w1, which causes a sense of discomfort on the display screen.

Figure 7:
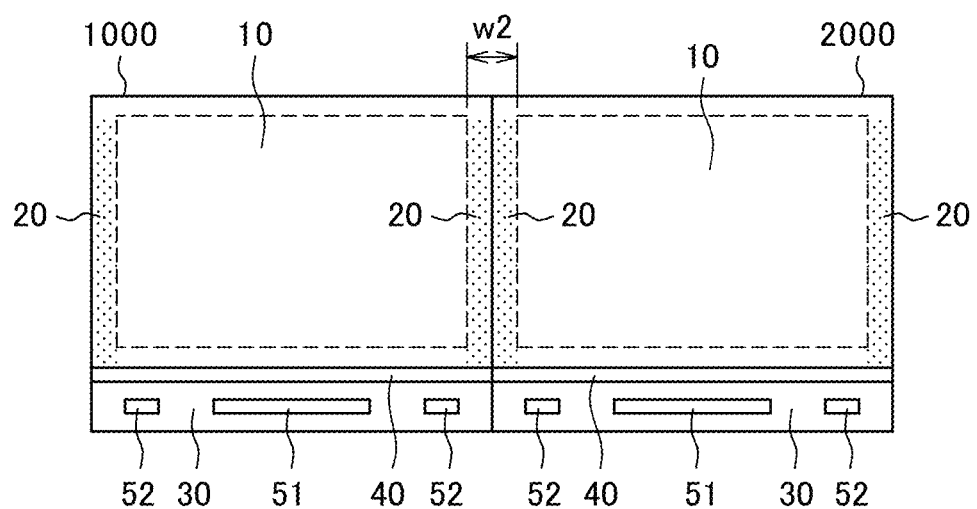
FIG. 7 is a front view of another problem in the case of creating a large screen by placing two transparent liquid crystal display devices side by side.

FIG. 7 depicts a front view of a configuration in which the width of the frame area 20 is reduced to make the screen breakup as small as w2 to counter this problem. In transparent liquid crystal display devices, the scanning line drawer lines are formed in the frame area 20. When the width of the frame area 20 is reduced, the density of the scanning line drawer lines increases, and as depicted by the shading in FIG. 7, the light transmittance in the frame area 20 decreases, degrading the quality as a transparent display device.

In other words, to make a transparent display device, both the display area 10 and the frame area 20 should have similar light transmittance. In the frame area 20, the wiring density of the drawer lines has a significant effect on the light transmittance. In order to set the wiring density to a predetermined value, the picture frame area 20 must have a predetermined width.

Figure 8:
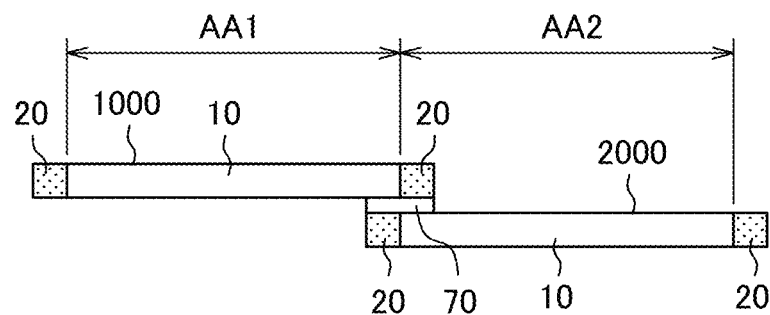
FIG. 8 is a cross-sectional view depicting the schematic structure of the invention.

FIG. 8 depicts a cross-sectional view of the basic configuration of the invention, which overcomes the above problems. In FIG. 8, the first transparent liquid crystal display device 1000 and the second transparent liquid crystal display device 2000 are arranged in such a way that the picture frame area 20 and the display area 10 overlap. According to the configuration depicted in FIG. 8, a display area AA1 of the first transparent liquid crystal display device 1000 and a display area AA2 of the second transparent liquid crystal display device 2000 can be seamlessly connected with each other.

In other words, the frame area 20 of the first transparent liquid crystal display device 1000 overlaps the display area 10 of the second transparent liquid crystal display device 2000, and the frame area 20 of the second transparent liquid crystal display device 2000 overlaps the display area 10 of the first transparent liquid crystal display device 1000. The first transparent liquid crystal display device 1000 and the second transparent liquid crystal display device 2000 are bonded together by the OCA 70 near the frame area 20. In FIG. 8, the frame area 20 is shaded for clarity in the drawing, but the frame area 20, like the display area 10, is also transparent.

Figure 9:
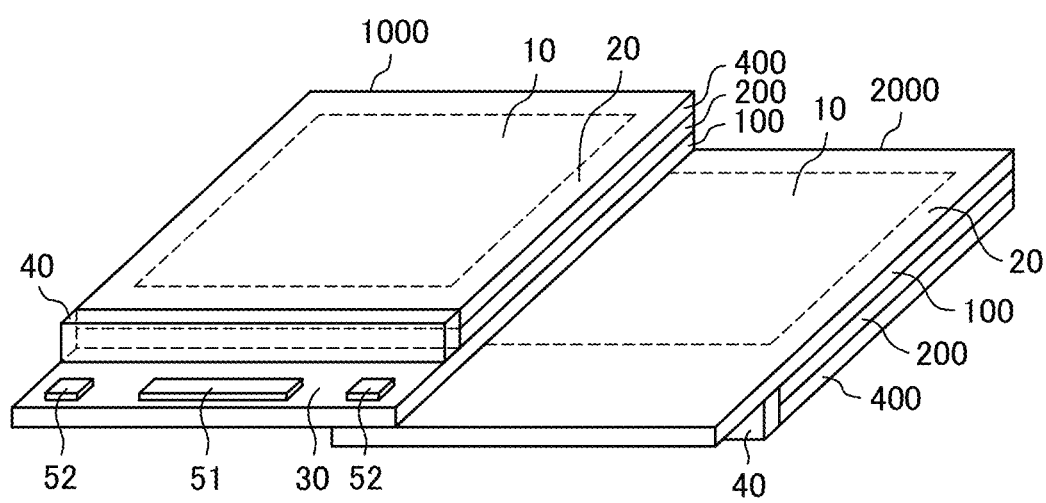
FIG. 9 is a perspective view of the configuration of Embodiment 1.

FIG. 9 is a perspective view specifically depicting the configuration of FIG. 8. In FIG. 9, the second transparent liquid crystal display device 2000 is arranged upside down with respect to the first transparent liquid crystal display device 1000, and the display area 10 and the frame area 20 overlap each other. The back side of the TFT substrate 100 of the first transparent liquid crystal display device 1000 and the back side of the TFT substrate 100 of the second transparent liquid crystal display device 2000 are adhered to each other via OCA in the frame area portion 20. Since each of the transparent liquid crystal display devices 1000 and 2000 depicted in FIG. 9 displays the same image whether viewed from the front or the back, there is no problem with the visibility of the transparent liquid crystal display device as a whole.

Figure 10:
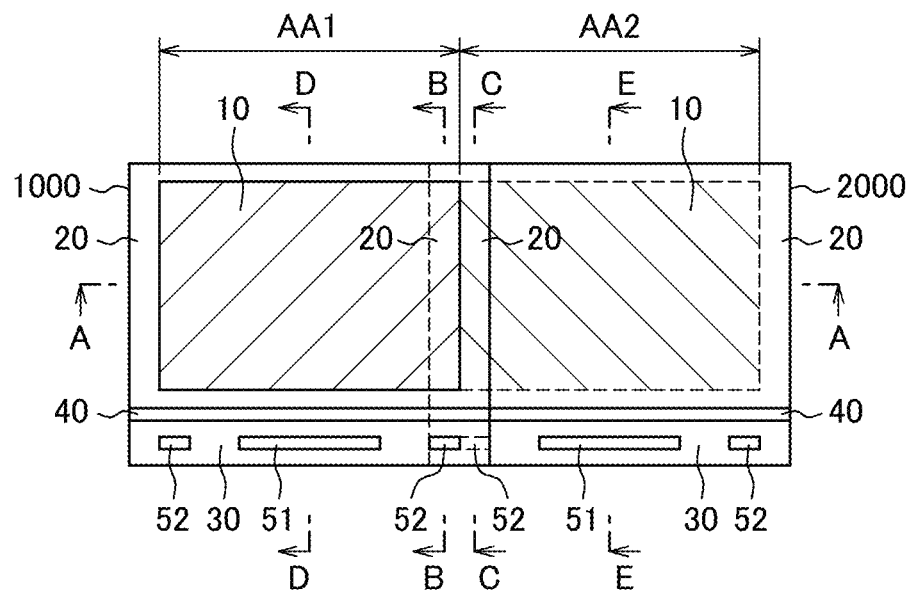
FIG. 10 is a plan view depicting the configuration of Embodiment 1.

FIG. 10 is a plan view of FIG. 9. In FIG. 10, the frame area 20 of the first transparent liquid crystal display device 1000 overlaps the display area 10 of the second transparent liquid crystal display device 2000. In FIG. 10, the display area 10 of the first transparent liquid crystal display device 1000 and the display area 10 of the second transparent liquid crystal display device 2000 are hatched, but the direction of the hatching is different. As depicted in FIG. 10, the display area 10 of the first transparent liquid crystal display device 1000 and the display area 10 of the second transparent liquid crystal display device 2000 are seamlessly connected with each other, in a plan view.

Here, the question is how precisely the two display areas 10 can be seamlessly connected. An aligning accuracy of two panels can be made in approximately 10 μm. On the other hand, visually, if the edges of the display area 10 of the first transparent liquid crystal display device 1000 and the display area 10 of the second transparent liquid crystal display device 2000 are aligned within 50 μm or less, it appears seamless.

Figure 11:
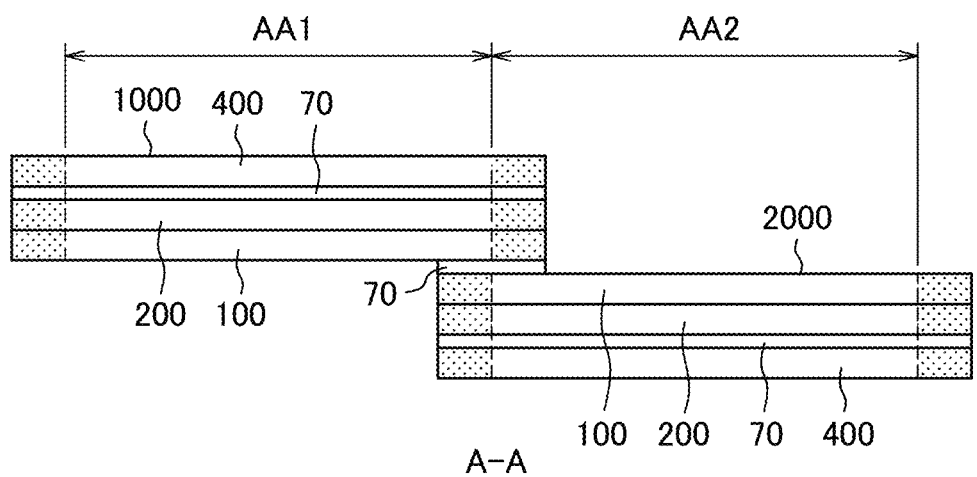
FIG. 11 is an A-A cross-sectional view of FIG. 10.

FIG. 11 is an A-A cross-sectional view of FIG. 10. FIG. 11 is similar to FIG. 8 except that the cross sections in the first transparent liquid crystal display device 1000 and the second transparent liquid crystal display device 2000 are detailed for each substrate. In FIG. 11, the display area AA1 of the first transparent liquid crystal display device 1000 and the display area AA2 of the second transparent liquid crystal display device 2000 are seamlessly connected with each other.

Figure 12:
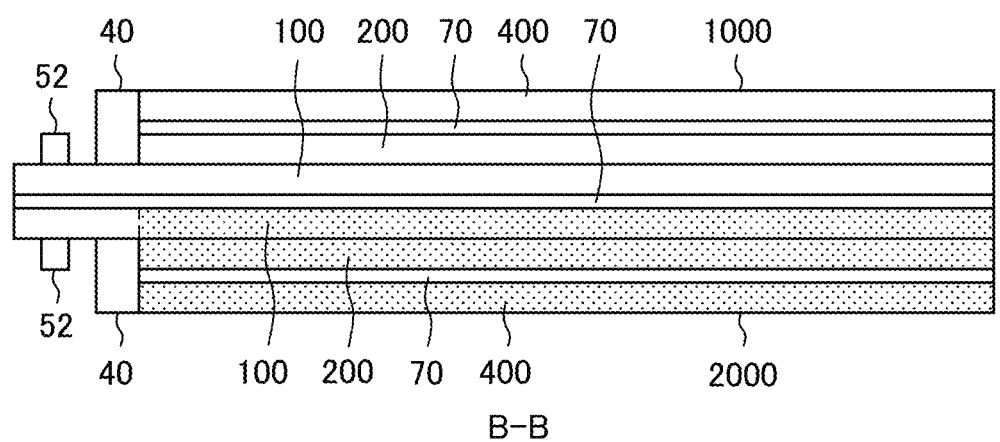
FIG. 12 is a B-B cross-sectional view of FIG. 10.

FIG. 12 is a B-B cross-sectional view of FIG. 10. FIG. 12 is the area where the first transparent liquid crystal display device 1000 and the second transparent liquid crystal display device 2000 overlap. In FIG. 12, the upper first transparent liquid crystal display device 1000 is the display area and the lower second transparent liquid crystal display device 2000 is the picture frame area. The lower transparent liquid crystal display device is shaded to indicate that it is a frame area, but this area is also transparent.

The area depicted in FIG. 12 is also formed by the first transparent liquid crystal display device 1000. The second transparent liquid crystal display device 2000 does not form an image in this area, but light from the light source 40 enters from the side of the opposing substrate 200 and the cover glass 400, so that the brightness of this area is not reduced.

Figure 13:
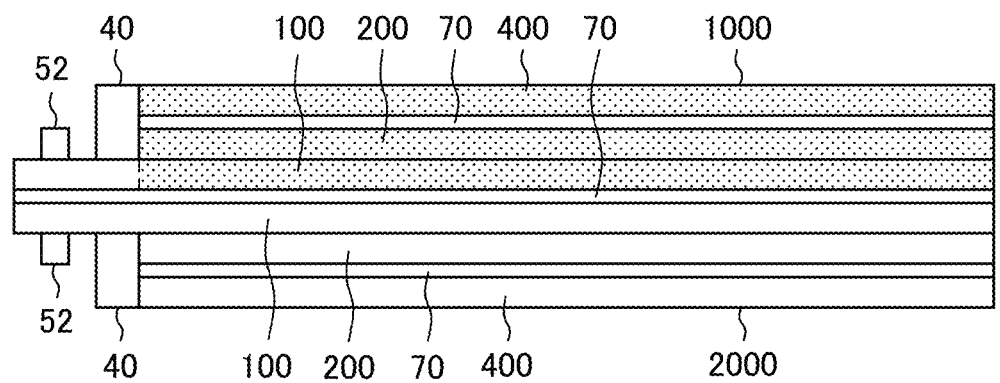
FIG. 13 is a C-C cross sectional view of FIG. 10.

FIG. 13 is a C-C cross-sectional view of FIG. 10. FIG. 13 is the area where the first transparent liquid crystal display device 1000 and the second transparent liquid crystal display device 2000 overlap. In FIG. 13, the upper first transparent liquid crystal display device 1000 is a frame area and the lower second transparent liquid crystal display device 2000 is a display area. The upper transparent liquid crystal display device 1000 is shaded to indicate that it is a frame area, but this area is also transparent.

The area depicted in FIG. 13 is also imaged by the second transparent liquid crystal display device 2000. The first transparent liquid crystal display device 1000 does not form an image in this area, but light from the light source 40 enters from the opposing substrate 200 and the side of the cover glass 400, so that the brightness of this area is not reduced.

As depicted in FIGS. 12 and 13, even in the frame area of either of the transparent liquid crystal display devices, the image is formed by the display area of the other transparent liquid crystal display device, so that the image is not interrupted. Although it is necessary to precisely align the edges of the display area 10 of the first transparent liquid crystal display device 1000 and the display area 10 of the second transparent liquid crystal display device 2000, this combination can be done with an accuracy of approximately 10 μm, therefore, it is not a practical problem.

Figure 14:
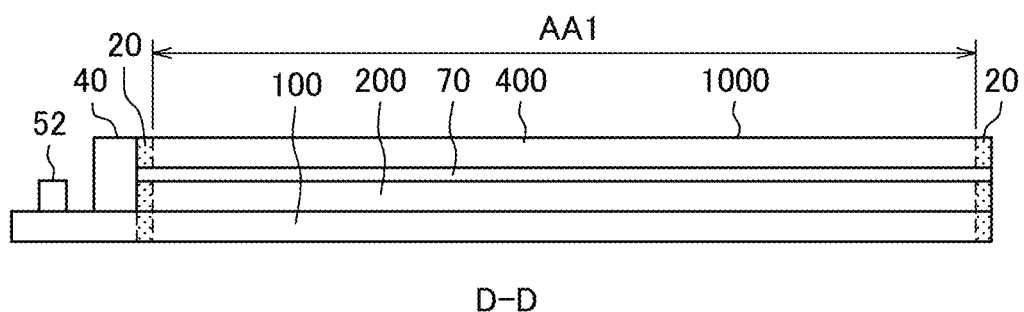
FIG. 14 is a D-D cross sectional view of FIG. 10.

FIG. 14 is a D-D cross-sectional view of FIG. 10. FIG. 14 is a cross-sectional view of the display area 10 of the transparent liquid crystal display device 1000. FIG. 14 has the same configuration in principle as the transparent liquid crystal display device depicted in FIG. 3. In FIG. 14, the frame area 20 is depicted in shading, but this area is still transparent.

Figure 15:
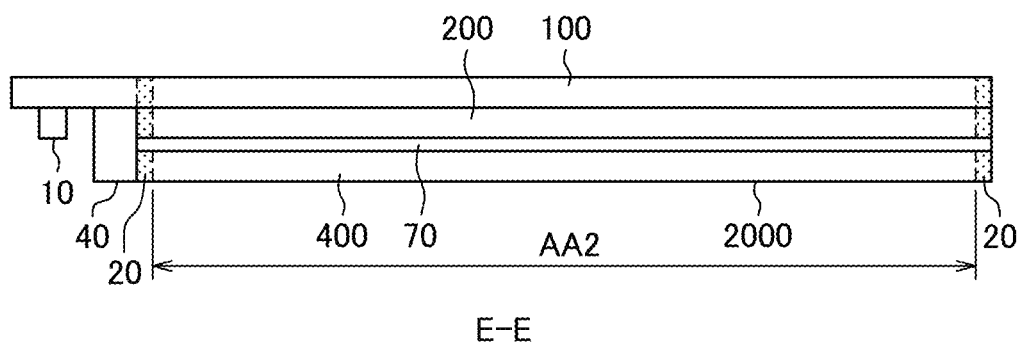
FIG. 15 is an E-E cross sectional view of FIG. 10.

FIG. 15 is an E-E cross-sectional view of FIG. 10. FIG. 14 is a cross-sectional view of the display area 10 of the second transparent liquid crystal display device 2000. FIG. 15 depicts a state of FIG. 14 being turned upside down, and has the same configuration in principle as the transparent liquid crystal display device depicted in FIG. 3. In FIG. 15, the frame area 20 is depicted in shading, but this area is still transparent. Since the same image can be viewed from the front side and the back side of the transparent liquid crystal display device, the image formed in FIG. 14 and the image formed in FIG. 15 are recognized as the same image.

Figure 16:
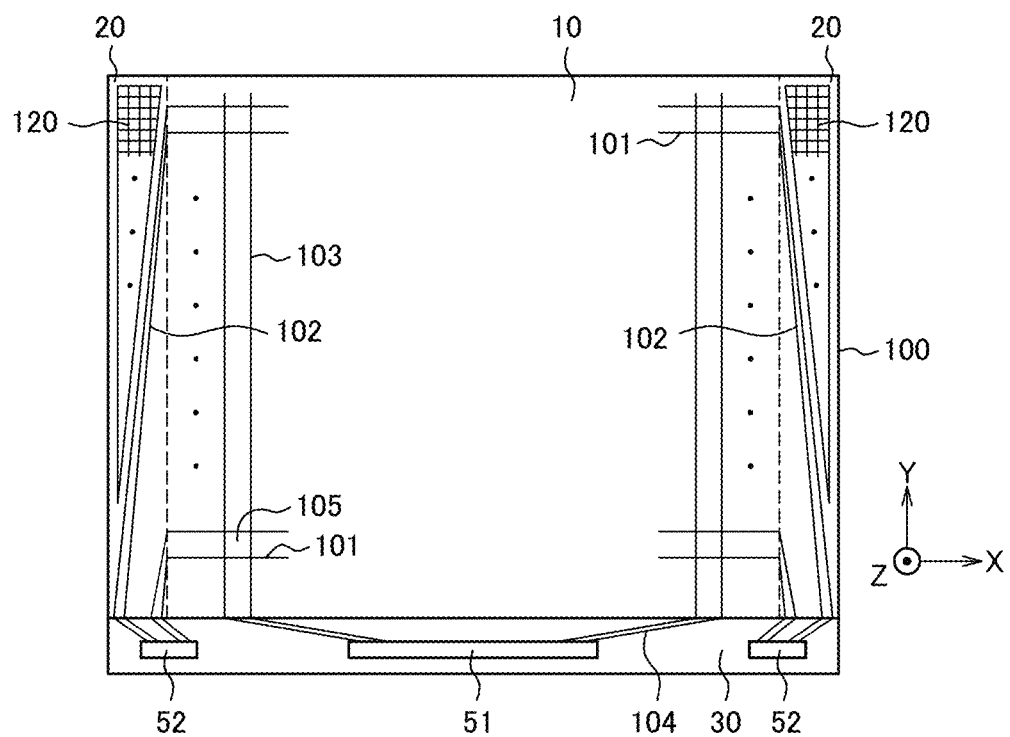
FIG. 16 is a plan view of a TFT substrate.

FIG. 16 depicts a plan view of the configuration of the TFT substrate 100. The TFT substrate 100 is divided into the display area 10, the frame area 20, and the terminal area 30. In the display area 10, scanning lines 101 extend in the horizontal direction (x direction) and are arranged in the vertical direction (y direction). In addition, the video signal lines 103 extend vertically and are arranged horizontally. In the area surrounded by the scanning lines 101 and the video signal lines 103, a pixel 105 including a pixel electrode and a TFT is formed.

The video signal line 103 extends to the terminal area 30 and connects to the driver IC 51 as a video signal line drawer line 104 in the terminal area 30. The scanning line 101 extends in the horizontal direction and becomes a scanning line drawer line 102 in the frame area 20 and extends in the direction of the terminal area 30.

In the frame area 20 of FIG. 16, the scanning line 102 becomes a diagonal wiring and extends toward the terminal area 30. In the frame region 20, there is a portion where the scanning line drawer line 102 does not exist. In this portion, a mesh (lattice) shaped perimeter wiring 120 having a plurality of openings formed of metal is formed, and a common potential is given to this perimeter wiring 120. The light transmittance of the frame area 20 is set to the same degree as that of the display area 10 by the scanning line drawer line 102 and the outer perimeter wiring 120.

In FIG. 16, the driver IC 51 that drives the video signal line 103 is located in the center of the terminal area 30 in the horizontal direction (x direction). On both sides of the driver IC 51, the driver IC 52 that drives the scanning line 101 is placed. By dividing the driver ICs in this way, the length of the drawer lines can be reduced.

Figure 17:
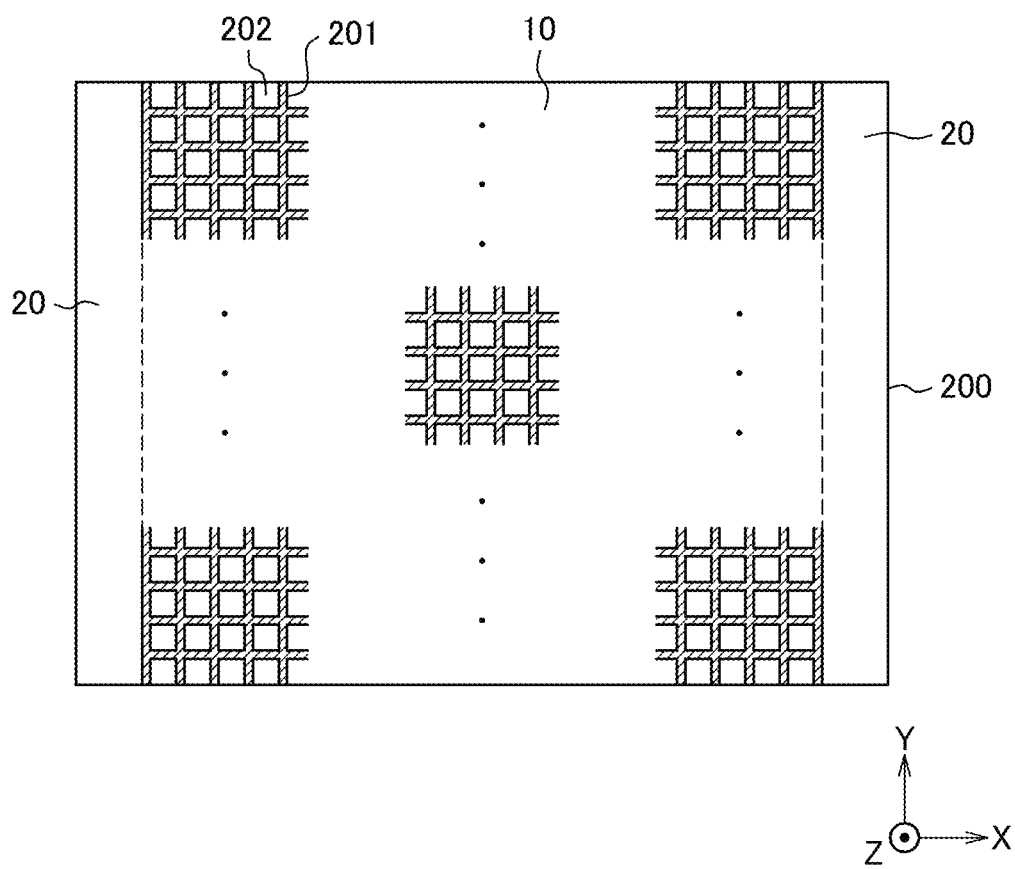
FIG. 17 is a plan view of an opposing substrate.

FIG. 17 is a plan view of the opposing substrate 200 corresponding to FIG. 16. The opposing substrate 200 is divided into the display area 10 and the frame area 20. In the display area 10 of FIG. 17, a black matrix 201 is formed corresponding to the video signal lines 103 and the scanning lines 101 of FIG. 16. The role of the black matrix 201 is to improve the contrast of the image and to prevent the generation of photocurrent in the TFT formed on the TFT substrate 100. Since the width of the black matrix 201 is larger than the widths of the video signal lines 103 and the scanning lines 101, the transmittance of the display area 10 is effectively determined by the transmittance of the black matrix 201.

The black matrix 201 is not formed in the picture frame area 20. Therefore, the transmittance of the frame area 20 is determined by the scanning line drawer lines 102 and the outer wiring 120 formed on the TFT substrate 100. On the entire surface of the opposite substrate 200 facing the TFT substrate 100, a common electrode 202 is formed by a transparent electrode such as indium tin oxide (ITO). The liquid crystal molecules 301 are driven by the electric field between the common electrode 202 formed on the opposite substrate 200 and a pixel electrode 115 formed on the TFT substrate 100.

However, as long as the transmittance of the frame area 20 is not significantly different from that of the display area 10, a structure in which the black matrix 201 is provided in the frame area 20 is also acceptable. One example is to form a black matrix with a metallic material and use a part of this black matrix 201 as a potential supply line extending from the frame area 20 to the display area 10 to supply a common potential to the common electrode 202. In another example, a black matrix having the same aperture ratio as the black matrix 201 in the display area 10 may be provided in the picture frame area 20 in a grid pattern for uniform appearance when viewed from the opposing substrate 200 side. Even in this case, since the black matrix 201 in the frame area 20 has multiple openings, the transparency of the frame area 20 is sufficiently ensured.

Figure 18:
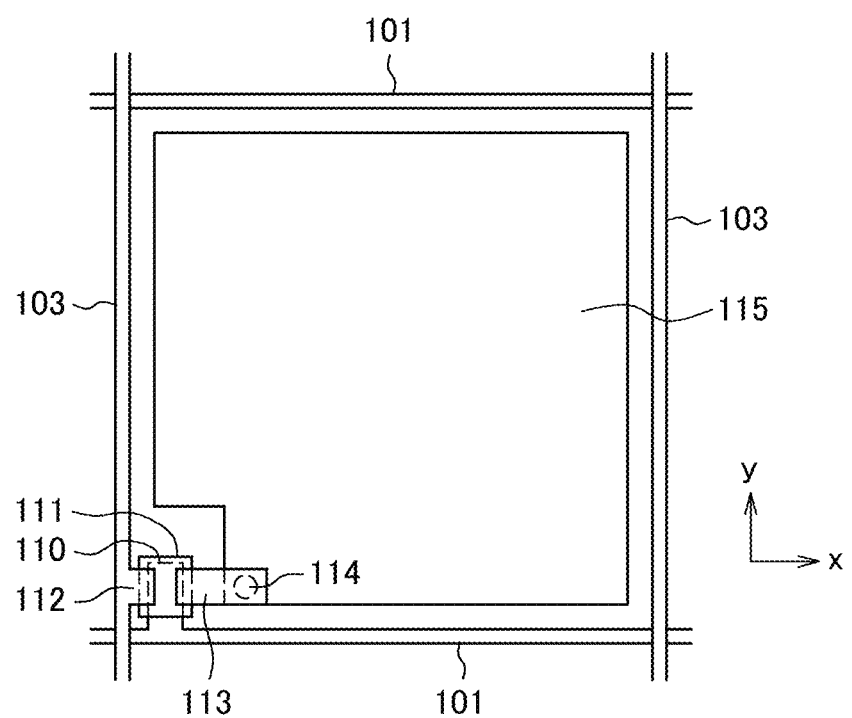
FIG. 18 is a plan view of a pixel.

FIG. 18 is a plan view of a pixel. In FIG. 18, the scanning lines 101 extend horizontally (x-direction) and are arranged vertically (y-direction); and the video signal lines 103 extend vertically and are arranged horizontally. The pixel electrode 115 is formed in the area surrounded by the scanning lines 101 and the video signal lines 103. A TFT is formed in the lower left corner of the pixel as a switching element. In FIG. 18, a portion of the scanning line 101 is branched to form a gate electrode 110, and a semiconductor layer 111 is formed over it. In FIG. 18, the video signal line 103 is branched to form a drain electrode 112. A source electrode 113 is connected to the pixel electrode 115 through a through hole 114.

Figure 19:
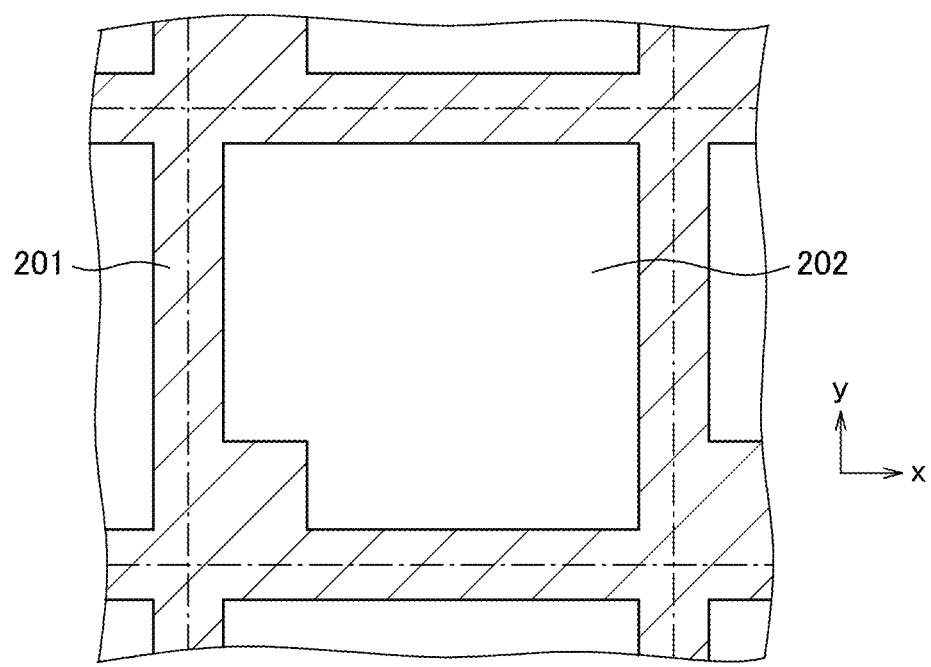
FIG. 19 is a plan view of a black matrix of the opposite substrate.

FIG. 19 is a plan view of the opposing substrate 200, corresponding to the pixel on the TFT substrate 100 side in FIG. 18. In FIG. 19, the black matrix 201 is formed in a grid pattern. The black matrix 201 is formed in correspondence with the scanning lines 101 and the video signal lines 103 in the TFT substrate 100. It is also formed to cover the TFT in FIG. 18.

Figure 20:
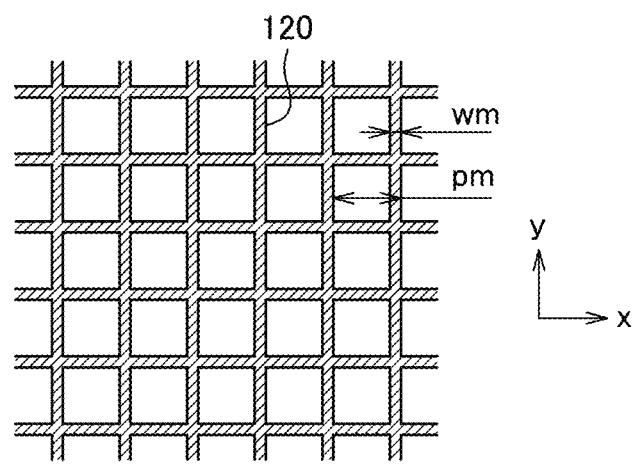
FIG. 20 is a plan view depicting peripheral wiring in a frame area.
Figure 21:
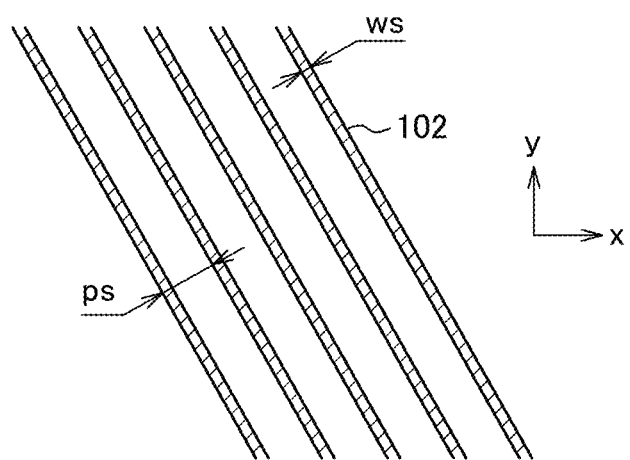
FIG. 21 is a plan view depicting scanning line drawer lines in the frame area.

FIG. 20 is a plan view depicting the shape of the outer perimeter wiring 120 formed in the frame area 20 of the TFT substrate 100. The outer perimeter wiring 120 is formed in a grid shape and has a plurality of apertures thereinside. The light transmittance is determined by the width wm and pitch pm of the wiring portions that constitute the mesh shape (grid) of the outer perimeter wiring. This transmittance is, for example, 84%. FIG. 21 is a plan view of the shape of the scanning line drawer line 102 in the frame area 20 of the TFT substrate 100. The scanning line drawer line 102 is a diagonal wiring. The light transmittance of the area where the scanning line drawer lines 102 are formed is determined by the pitch ps of the scanning line drawer lines 102 and the width ws of the scanning line drawer lines 102. This transmittance is, for example, 84%.

Thus, the transmittance in the frame area 20 can be easily set. In the present invention, the light transmittance of the display area 10 and the light transmittance of the frame area 20 are matched as much as possible. In the display area 10, the transmittance is determined by the black matrix 201 formed on the opposing substrate 200. On the other hand, in the picture frame area 20, it is determined by the wiring width and wiring pitch of the scanning line drawer line 102 and outer wiring 120 formed on the TFT substrate 100. Therefore, the light transmittance can be easily set for both the display area 10 and the frame area 20. It is desirable that a difference of the light transmittance between the display area 10 and the picture frame area 20 is less than 5%.

In most practical cases, the light transmittance of the frame area 20 is matched to the light transmittance of the display area 10. The width of the frame area 20 is to be determined in relation to the light transmittance to be set. In order to make the effects of transmittance fluctuations as inconspicuous as possible, the light transmittance of the display area 10 and the picture frame area 20 should be as high as possible. In this example, the transmittance of the display area 10 and the frame area 20 are each 80% or higher.

If a metallic material with low electrical resistance is used for the scanning lines 101, the video signal lines 103, the scanning line drawer lines 102, etc. formed on the TFT substrate 100, the width of the wiring can be reduced, which is advantageous for improving the light transmittance of the transparent display device. In this example, wiring with a structure in which Aluminum (Al) is stacked on top of Molybdenum (Mo) is used for these wirings. In particular, Al can reduce the wiring resistance, so that the wiring can be made thinner. The same is true for the outer perimeter wiring 120 formed in the frame area 20.

Embodiment 2

Figure 22:
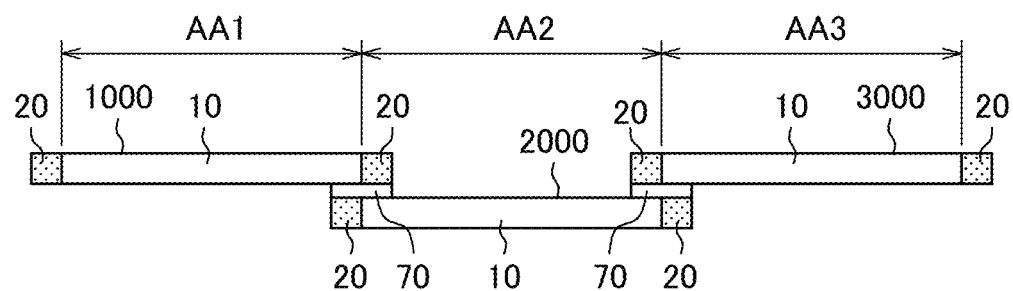
FIG. 22 is a cross-sectional view of Embodiment 2.

In Embodiment 1, two transparent liquid crystal display devices are arranged in parallel to realize a large-screen transparent liquid crystal display device. The configuration described in Embodiment 1 can also be applied when three or more transparent liquid crystal display devices are arranged in parallel to form an even larger screen. FIG. 22 depicts a schematic cross-sectional view of a case in which three transparent liquid crystal display devices are arranged in parallel to form a large-screen transparent display device.

In FIG. 22, the combination of the first transparent liquid crystal display device 1000 and the second transparent liquid crystal display device 2000 is the same configuration as that described in Embodiment 1. In FIG. 22, the combination of the second transparent display device 2000 and the third transparent display device 3000 can also be combined according to the same principle as in Embodiment 1.

In other words, a large-screen transparent display device can be formed in which the display areas 10 having the width AA1, the display areas 10 having the width AA2, and the display areas 10 having the width AA3 are seamlessly connected. The same is true when forming a large-screen transparent liquid crystal display device using four or more transparent liquid crystal display devices.

Embodiment 3

Figure 23:
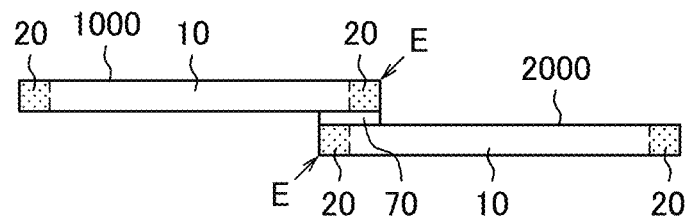
FIG. 23 is a cross-sectional view depicting the issues of Embodiment 3.

In Embodiment 1, two transparent liquid crystal display devices are stacked near the frame area 20, resulting in a step. This step may affect visibility. FIG. 23 depicts a cross-sectional view of this problem. FIG. 23 is the same as FIG. 8 in Embodiment 1, so that the explanation of the structure is omitted. In FIG. 23, the edges of the transparent liquid crystal display devices 1000 and 2000, indicated by arrow E, may affect visibility depending on the application of the display device.

Figure 24:
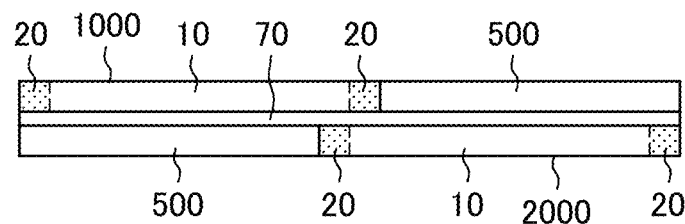
FIG. 24 is a cross-sectional view of Embodiment 3.

FIG. 24 depicts a cross-sectional view of a transparent display device that counteracts this problem. In FIG. 24, a glass plate 500 is attached to the back of the TFT substrate 100 of the first transparent liquid crystal display device 1000 via the OCA 70. The thickness of the glass plate 500 is the sum of the thickness of the three glass substrates and the thickness of the OCA of 0.1 mm. For example, when the thickness of each of the TFT substrate 100, the opposing substrate 200, and the cover glass 400 is 0.7 mm and the thickness of the OCA 70 is 0.1 mm, a thickness of the glass plate 500 is 2.2 mm, and the surface of the glass plate 500 is flush with the surface of the second transparent liquid crystal display device 200. Similarly, by attaching the glass plate 500 of the same thickness to the back side (top side) of the TFT substrate 100 of the second transparent liquid crystal display device 2000, the surface of the first transparent liquid crystal display device 1000 and the surface of the glass plate 500 can be made flush.

By using the configuration depicted in FIG. 24, the surface of a transparent display device using multiple transparent liquid crystal display devices can be flattened, and the deterioration in visibility due to the presence of steps can be counteracted. In addition, the configuration depicted in FIG. 24 can make the surface the same as a single smooth plate, which facilitates handling of the transparent liquid crystal display device.

Embodiment 4

Regarding each of the first transparent liquid crystal display device 1000 and the second transparent liquid crystal display device 2000 in Embodiment 1, the display area 10 is an overlay of three glass substrates, while the terminal area 30 is a single TFT substrate. Depending on the application of the transparent liquid crystal display device, the mechanical strength of the terminal area 30 may be a problem.

Figure 25:
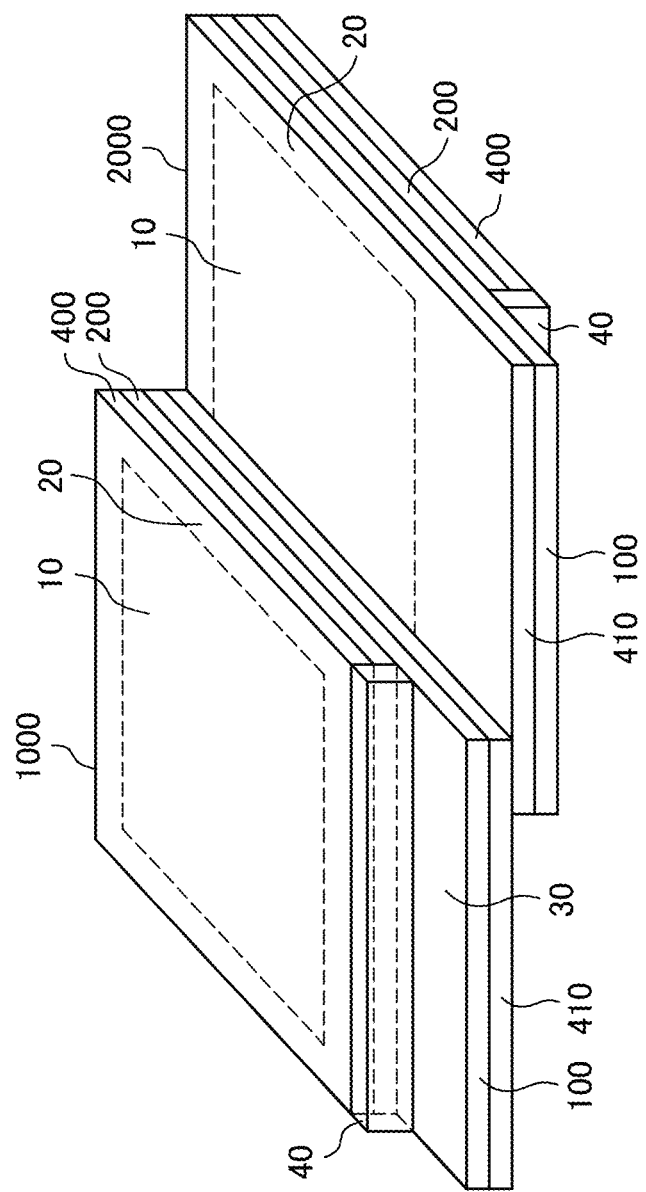
FIG. 25 is a perspective view of Embodiment 4.

FIG. 25 is a perspective view of a transparent liquid crystal display device that addresses this issue. The point where FIG. 25 differs from FIG. 9 in Embodiment 1 is that the cover glass 410 is attached to the back side of the TFT substrate 100. This reinforces the strength of the TFT substrate 100. The thickness of the cover glass 410 can be, for example, 0.7 or 0.5 mm, which is the same as the TFT substrate 100. The other configurations in FIG. 25 are the same as those in FIG. 9 of Embodiment 1, so that they are not described here.

Embodiment 5

In Embodiments 1 through 4, the transparent liquid crystal display device is flat. On the other hand, there exists a demand for transparent liquid crystal display devices to be curved. Even transparent liquid crystal display devices using glass substrates can be easily curved when the glass substrate is made thinner. The present invention can be also applied to such curved display devices.

Figure 26:
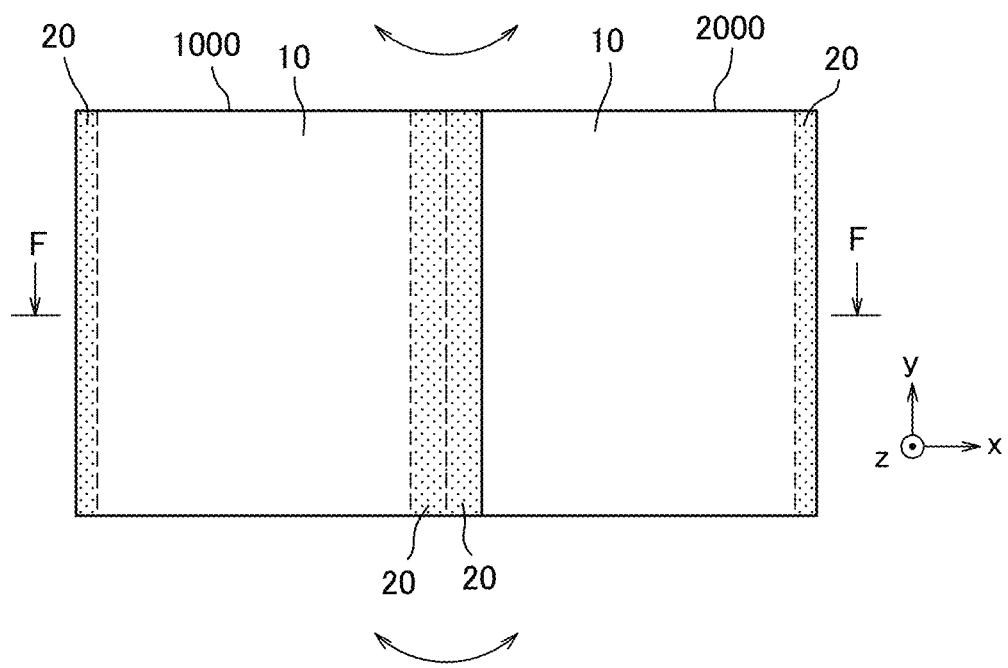
FIG. 26 is a front view of a first example of Embodiment 5.
Figure 27:
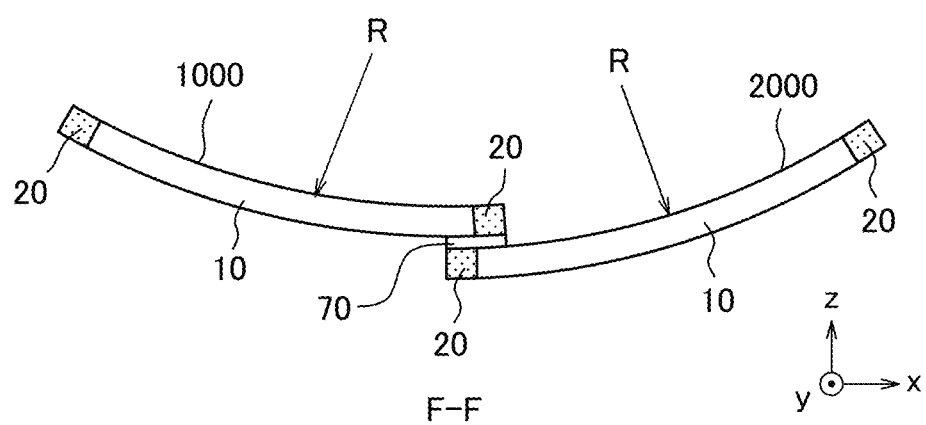
FIG. 27 is an F-F cross-sectional view of FIG. 26.
Figure 28:
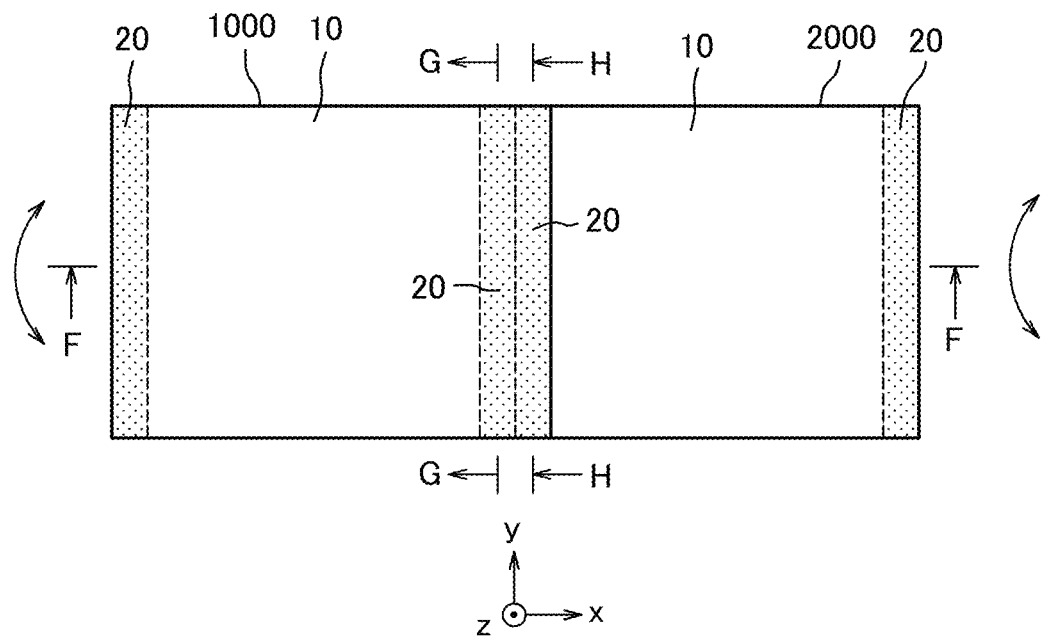
FIG. 28 is a front view of a second example of Embodiment 5.
Figure 29:
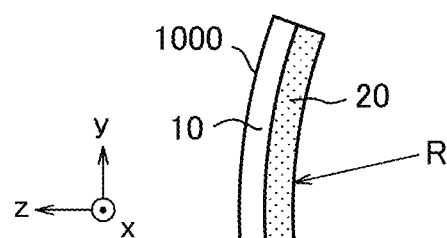
FIG. 29 is a G-G cross-sectional view of FIG. 28.
Figure 30:
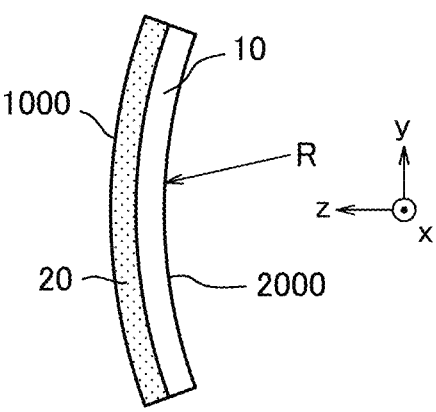
FIG. 30 is an H-H cross-sectional view of FIG. 28.

When curving a display device, there are many possible curvatures. As representative examples, FIGS. 26 and 27 depict the case of curving with a radius R along the horizontal axis (x-axis), and FIGS. 28 through 30 depict the case of curving with a radius R along the vertical axis (y-axis). In the transparent display devices 1000 and 2000 depicted in FIG. 26 through 30, the terminal area is omitted and only the display area 10 and frame area 20 are described.

FIG. 26 depicts an example of an assembly of the first transparent liquid crystal display device 1000 and the second transparent liquid crystal display device 2000 curved along the x-axis, as depicted by the arrows in both directions. The first transparent liquid crystal display device 1000 and the second transparent liquid crystal display device 2000 overlap near the frame area 20. FIG. 27 is an F-F cross-sectional view of FIG. 26. The configuration of FIG. 26 is the same as that described in FIG. 8 of Embodiment 1, except that the first transparent liquid crystal display device 1000 and the second transparent liquid crystal display device 2000 are curved.

FIG. 28 depicts an example of the assembly of the first transparent liquid crystal display device 1000 and the second transparent liquid crystal display device 2000 curved along the y-axis, as depicted by the arrows in both directions. The first transparent liquid crystal display device 1000 and the second transparent liquid crystal display device 2000 overlap near the frame area 20. The configuration in FIG. 28 is not curved along the x-axis, so that the I-I cross section in FIG. 28 is the same as that in FIG. 8.

FIG. 29 is a G-G cross sectional view of FIG. 28. In FIG. 29, the display area 10 of the first transparent liquid crystal display device 1000 and the frame area 20 of the second transparent liquid crystal display device 2000 overlap. FIG. 30 is an H-H cross-sectional view of FIG. 28. In FIGS. 29 and 30, the OCA is omitted. In FIG. 30, the frame area 20 of the first transparent liquid crystal display device 1000 and the display area 10 of the second transparent liquid crystal display device 2000 overlap. The configuration of FIGS. 29 and 30 is similar to that described in FIGS. 12 and 13 in Embodiment 1, except that the transparent liquid crystal display devices 1000 are 2000 are curved. Thus, the present invention can be applied to curved transparent display devices.

In the above explanation, the outline of the transparent display device or the display area is a rectangle. However, the present invention can also be used for transparent display devices with external shapes or display areas other than rectangles. In other words, even for such odd-shaped transparent display devices, it is possible to arrange multiple display areas without interruption by overlapping the display area of the first transparent display device and the frame area of the second transparent display device. This makes it possible to realize a large-screen transparent display device using multiple transparent display devices, even for an odd-shaped transparent display device.

Furthermore, in the description of this embodiment, the superposition of the left and right picture frame areas and the display area is described; however, even in the upper picture frame area, which is the opposite side of the light source side, the display area and the upper picture frame of multiple transparent display devices may be superposed so that the display areas can be seamlessly connected to each other.

What is claimed is:

1. A liquid crystal display device comprising:
a first liquid crystal display device including a first thin-film transistor substrate and a first opposing substrate being bonded together at a first frame area with a first sealant, a first liquid crystal being sealed therein, and a first display area being formed in an area in which the first liquid crystal is sandwiched;
a second liquid crystal display device including a second thin-film transistor substrate and a second opposing substrate being bonded together at a second frame area with a second sealant, a second liquid crystal being sealed therein, and a second display area being formed in an area in which the second liquid crystal is sandwiched,
wherein the first liquid crystal display device and the second liquid crystal display device are arranged in parallel, with portions thereof overlapping each other,
the first frame area of the first liquid crystal display device overlaps the second display area of the second liquid crystal display device, and the second frame area of the second liquid crystal display device overlaps the first display area of the first liquid crystal display device,
the first display area and the second display area are continuous in a plan view,
a first terminal area is formed in an area in which the first opposing substrate does not overlap with the first thin-film transistor substrate,
a first light source including a first light emitting diode is disposed opposing to a first side of the first opposing substrate in the first terminal area,
a second terminal area is formed in an area in which the second opposing substrate does not overlap with the second thin-film transistor substrate, and
a second light source including a second light emitting diode is disposed opposing to a second side of the second opposing substrate in the second terminal area.

2. The liquid crystal display device according to claim 1, wherein first scanning lines extend in a first direction and are arranged in a second direction, and first video signal lines extend in the second direction and are arranged in the first direction in the first display area,
first scanning line drawer lines, which connect with the first scanning lines, are formed, and a first common electrode being lattice shaped is formed in an area in which the first scanning line drawer lines are not formed in the first frame area,
second scanning lines extend in the first direction and are arranged in the second direction, and second video signal lines extend in the second direction and are arranged in the first direction in the second display area, and second scanning line drawer lines, which connect with the second scanning lines, are formed, and a second common electrode being lattice shaped is formed in an area in which the second scanning line drawer lines are not formed in the second frame area.

3. The liquid crystal display device according to claim 1, wherein the liquid crystal is polymer dispersed liquid crystal.

4. The liquid crystal display device according to claim 1, wherein a first surface of the first thin-film transistor substrate, which is an opposite surface to a first counter surface on which the first opposing substrate exists, and a second surface of the second thin-film transistor substrate, which is an opposite surface to a second counter surface on which the second opposing substrate exists are adhered to each other with a transparent adhesive sheet.

5. The liquid crystal display device according to claim 1, wherein a first cover glass is adhered to the first thin-film transistor substrate, the first light source opposes to a side surface of the first cover glass, and a second cover glass is adhered to the second thin-film transistor substrate, the second light source opposes to a side surface of the second cover glass.

6. The liquid crystal display device according to claim 1, wherein a light transmittance of the first display area is 80% or more, and light transmittance of the second display area is 80% or more.

7. The liquid crystal display device according to claim 1, wherein a light transmittance of the first frame area is 80% or more, and a light transmittance of the second frame area is 80% or more.

8. The liquid crystal display device according to claim 1, wherein a difference in light transmittance between the first display area and the first frame area is 5% or less, and a difference in light transmittance between the second display area and the second frame area is 5% or less.

9. The liquid crystal display device according to claim 1, wherein a first transparent substrate is attached to the first liquid crystal display device, and a second transparent substrate is attached to the second liquid crystal display device, and the liquid crystal display device is plate like as a hole.

10. A liquid crystal display device comprising:
a first liquid crystal display device including a first thin-film transistor substrate and a first opposing substrate being bonded together at a first frame area with a first sealant, a first liquid crystal being sealed therein, and a first display area being formed in an area in which the first liquid crystal is sandwiched;

a second liquid crystal display device including a second thin-film transistor substrate and a second opposing substrate being bonded together at a second frame area with a second sealant, a second liquid crystal being sealed therein, and a second display area being formed in an area in which the second liquid crystal is sandwiched, wherein the first liquid crystal display device and the second liquid crystal display device are arranged in parallel, with portions thereof overlapping each other, the first frame area of the first liquid crystal display device overlaps the second display area of the second liquid crystal display device, and the second frame area of the second liquid crystal display device overlaps the first display area of the first liquid crystal display device, the first display area and the second display area are continuous in a plan view, first scanning lines extend in a first direction and are arranged in a second direction, and first video signal lines extend in the second direction and are arranged in the first direction in the first display area, first scanning line drawer lines, which connect with the first scanning lines, are formed, and a first common electrode being lattice shaped is formed in an area in which the first scanning line drawer lines are not formed in the first frame area, second scanning lines extend in the first direction and are arranged in the second direction, and second video signal lines extend in the second direction and are arranged in the first direction in the second display area, and second scanning line drawer lines, which connect with the second scanning lines, are formed, and a second common electrode being lattice shaped is formed in an area in which the second scanning line drawer lines are not formed in the second frame area.

11. A liquid crystal display device comprising:
a first liquid crystal display device including a first thin-film transistor substrate and a first opposing substrate being bonded together at a first frame area with a first sealant, a first liquid crystal being sealed therein, and a first display area being formed in an area in which the first liquid crystal is sandwiched;

a second liquid crystal display device including a second thin-film transistor substrate and a second opposing substrate being bonded together at a second frame area with a second sealant, a second liquid crystal being sealed therein, and a second display area being formed in an area in which the second liquid crystal is sandwiched, wherein the first liquid crystal display device and the second liquid crystal display device are arranged in parallel, with portions thereof overlapping each other, the first frame area of the first liquid crystal display device overlaps the second display area of the second liquid crystal display device, and the second frame area of the second liquid crystal display device overlaps the first display area of the first liquid crystal display device, the first display area and the second display area are continuous in a plan view, a first surface of the first thin-film transistor substrate, which is an opposite surface to a first counter surface on which the first opposing substrate exists, and a second surface of the second thin-film transistor substrate, which is an opposite surface to a second counter surface on which the second opposing substrate exists are adhered to each other with a transparent adhesive sheet.

* * * * *